US011919613B2

(12) United States Patent
Terada

(10) Patent No.: US 11,919,613 B2
(45) Date of Patent: Mar. 5, 2024

(54) RESCUE NETWORK SYSTEM FOR WATERCRAFT

(71) Applicant: YAMAHA HATSUDOKI KABUSHIKI KAISHA, Iwata (JP)

(72) Inventor: Kohei Terada, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 500 days.

(21) Appl. No.: 17/186,047

(22) Filed: Feb. 26, 2021

(65) Prior Publication Data

US 2021/0276674 A1 Sep. 9, 2021

(30) Foreign Application Priority Data

Mar. 4, 2020 (JP) ................................ 2020-036601

(51) Int. Cl.

| | |
|---|---|
| *B63B 45/00* | (2006.01) |
| *B63C 9/28* | (2006.01) |
| *G08B 21/18* | (2006.01) |
| *G08B 25/10* | (2006.01) |

(52) U.S. Cl.

CPC .................. *B63C 9/21* (2013.01); *B63C 9/28* (2013.01); *G08B 21/18* (2013.01); *G08B 25/10* (2013.01)

(58) Field of Classification Search

CPC .. B63C 9/21; B63C 9/28; G08B 21/18; G08B 25/10

USPC ........................................................... 701/21

See application file for complete search history.

(56) References Cited

U.S. PATENT DOCUMENTS

| | | | | |
|---|---|---|---|---|
| 5,517,199 | A * | 5/1996 | DiMattei | G01S 19/36 342/357.31 |
| 7,612,686 | B1 * | 11/2009 | Bustamante | H04B 13/02 340/425.1 |
| 11,520,042 | B1 * | 12/2022 | Douglass | G01C 13/00 |
| 2009/0040073 | A1 * | 2/2009 | Bootes | B63B 49/00 340/984 |
| 2009/0187297 | A1 * | 7/2009 | Kish | G05B 23/0213 701/21 |
| 2014/0266793 | A1 * | 9/2014 | Velado | B63B 79/10 340/870.16 |
| 2016/0180721 | A1 * | 6/2016 | Otulic | B60Q 9/00 701/2 |
| 2017/0212555 | A1 * | 7/2017 | Fafard | G01C 21/20 |
| 2017/0253310 | A1 * | 9/2017 | Hashizume | H04B 1/385 |
| 2020/0020221 | A1 * | 1/2020 | Cutler | G08B 21/088 |
| 2020/0055579 | A1 * | 2/2020 | Wright | B63C 1/06 |

(Continued)

FOREIGN PATENT DOCUMENTS

| | | | | |
|---|---|---|---|---|
| CA | 2993555 | A1 * | 8/2018 | A01K 69/06 |
| CA | 3064526 | A1 * | 11/2018 | B63B 23/30 |

(Continued)

*Primary Examiner* — Atul Trivedi

(74) *Attorney, Agent, or Firm* — Keating & Bennett, LLP

(57) ABSTRACT

In a rescue network system for a watercraft, a transmitter transmits a first distress signal of the watercraft to which it belongs. A receiver receives a second distress signal from another watercraft. An output outputs emergency information indicating the existence of the second distress signal from the another watercraft. A controller is configured or programmed to control the output to output the emergency information when the receiver has received the second distress signal from the another watercraft.

7 Claims, 6 Drawing Sheets

(56) References Cited

U.S. PATENT DOCUMENTS

| | | | | |
|---|---|---|---|---|
| 2020/0128383 | A1* | 4/2020 | Maier | B63B 45/00 |
| 2020/0135000 | A1* | 4/2020 | Asiri | G08B 21/084 |
| 2020/0258367 | A1* | 8/2020 | Jungmar | G08B 6/00 |
| 2021/0190702 | A1* | 6/2021 | Wu | G01S 7/411 |
| 2022/0026519 | A1* | 1/2022 | Wu | G01S 7/006 |
| 2022/0026530 | A1* | 1/2022 | Wu | G01S 7/006 |
| 2022/0026531 | A1* | 1/2022 | Wu | G01S 13/88 |

FOREIGN PATENT DOCUMENTS

| | | | | | |
|---|---|---|---|---|---|
| CA | 2997440 | A1 | * | 9/2019 | |
| CA | 3003863 | A1 | * | 11/2019 | |
| CA | 3113214 | A1 | * | 8/2022 | G01S 13/726 |
| CN | 111619763 | A | * | 9/2020 | B63C 9/00 |
| CN | 212921925 | U | * | 4/2021 | B63C 9/00 |
| CN | 113232785 | A | * | 8/2021 | |
| CN | 114180016 | A | * | 3/2022 | |
| CN | 216035010 | U | * | 3/2022 | |
| CN | 114954848 | A | * | 8/2022 | |
| CN | 111619763 | A | * | 9/2022 | B63C 9/00 |
| GB | 2396729 | A | * | 6/2004 | B60R 25/1004 |
| JP | 2023014016 | A | * | 1/2023 | |
| KR | 20190081426 | A | * | 7/2019 | G08B 25/004 |
| WO | WO-2023022612 | A1 | * | 2/2023 | |

* cited by examiner

RESCUE NETWORK SYSTEM FOR WATERCRAFT

CROSS REFERENCE TO RELATED APPLICATIONS

This application claims the benefit of priority to Japanese Patent Application No. 2020-036601 filed on Mar. 4, 2020. The entire contents of this application are hereby incorporated herein by reference.

BACKGROUND OF THE INVENTION

1. Field of the Invention

The present invention relates to a rescue network system for watercraft.

2. Description of the Related Art

An operator of a watercraft, when encountering some kind of trouble during navigation, informs another watercraft navigating nearby of the occurrence of an emergency by using a tool such as a whistle, a smoke marker, or so forth. Alternatively, the operator calls for a rescue service by using a communication means such as a mobile phone.

However, in order for the operator of the troubled watercraft to successfully inform the another watercraft of the occurrence of the emergency by using the tool, it is premised that the another watercraft is located at a distance nearby enough to fall within the field of view of the troubled watercraft. Because of this, the method of informing the another watercraft of the occurrence of the emergency by using the tool is not suitable for a place with low marine traffic or a place with poor visibility due to complicated terrain.

In calling for a rescue service, the operator of the troubled watercraft is supposed to wait for the arrival of a rescue team from a far-away base, which takes a considerable time for the operator to be rescued. Incidentally, when a watercraft of an acquaintance happens to pass nearby, the operator of the troubled watercraft can be quickly rescued by making a phone call for rescue to the acquaintance watercraft. However, such a situation seldom occurs.

SUMMARY OF THE INVENTION

Preferred embodiments of the present invention provide systems that are each able to transmit and receive a distress signal of a watercraft such that the watercraft is able to be quickly rescued even without other watercraft being located close enough to be within the field of view of the watercraft.

A system according to a preferred embodiment of the present invention includes a transmitter, a receiver, an output, and a controller. The transmitter transmits a first distress signal of a watercraft in which the system is installed. The receiver receives a second distress signal from another watercraft. The output outputs emergency information indicating the existence of the second distress signal from the another watercraft. The controller is configured or programmed to control the output to output the emergency information when the receiver has received the second distress signal from the another watercraft.

A rescue network system for watercraft according to another preferred embodiment of the present invention is installed in a plurality of watercraft including a first watercraft and a second watercraft. The rescue network system includes a first watercraft system and a second watercraft system. The first watercraft system is installed in the first watercraft. The first watercraft system includes a first transmitter, a first receiver, a first output, and a first controller. The first transmitter transmits a first distress signal of the first watercraft. The first receiver receives a second distress signal from the second watercraft. The first output outputs emergency information indicating existence of the second distress signal from the second watercraft. The first controller is configured or programmed to control the first output to output the emergency information indicating the existence of the second distress signal from the second watercraft when the first receiver has received the second distress signal from the second watercraft.

The second watercraft system is installed in the second watercraft. The second watercraft system includes a second transmitter, a second receiver, a second output, and a second controller. The second transmitter transmits the second distress signal of the second watercraft. The second receiver receives the first distress signal from the first watercraft. The second output outputs emergency information indicating the existence of the first distress signal from the first watercraft. The second controller is configured or programmed to control the second output to output the emergency information indicating the existence of the first distress signal from the first watercraft when the second receiver has received the first distress signal from the first watercraft.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
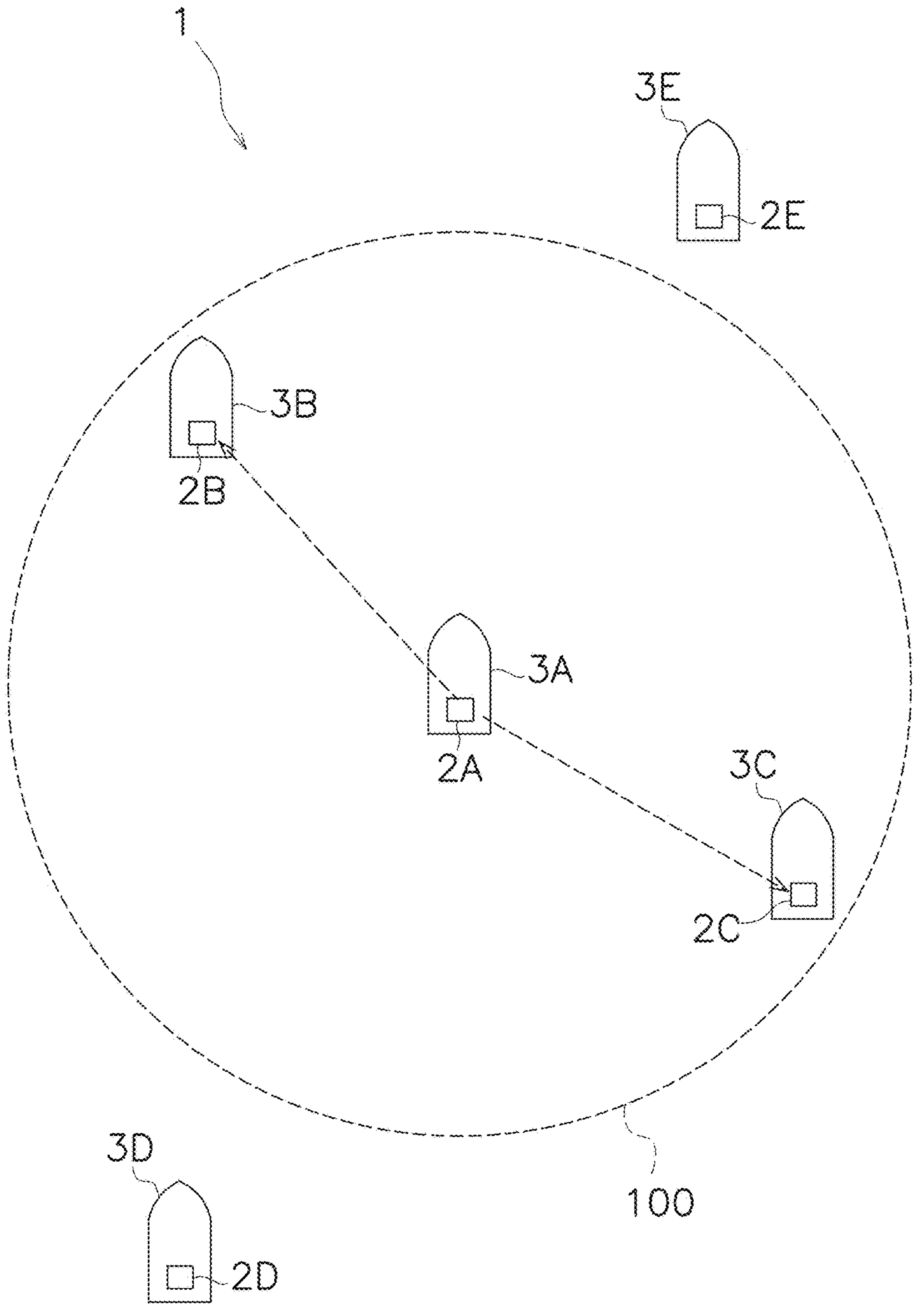
FIG. 1 is a schematic diagram showing a configuration of a rescue network system according to a preferred embodiment of the present invention.

Preferred embodiments of the present invention will be hereinafter explained with reference to drawings. FIG. 1 is a schematic diagram showing a configuration of a rescue network system 1 according to a preferred embodiment of the present invention. As shown in FIG. 1, the rescue network system 1 includes a plurality of watercraft systems 2A to 2E. The watercraft systems 2A to 2E are installed in watercraft 3A to 3E, respectively. Each of the watercraft systems 2A to 2E transmits a distress signal to each of the other watercraft systems located within a predetermined communication range 100. Each of the watercraft systems 2A to 2E receives a distress signal from each of the other watercraft systems located within the predetermined communication range 100. Among the combinations of the plurality of watercraft systems 2A to 2E, a combination of the first and second watercraft systems 2A and 2B will be hereinafter explained, but the remaining combinations are configured in a similar manner to the combination of the first and second watercraft systems 2A and 2B. The first watercraft system 2A is installed in a first watercraft 3A. The second watercraft system 2B is installed in a second watercraft 3B.

Figure 2:
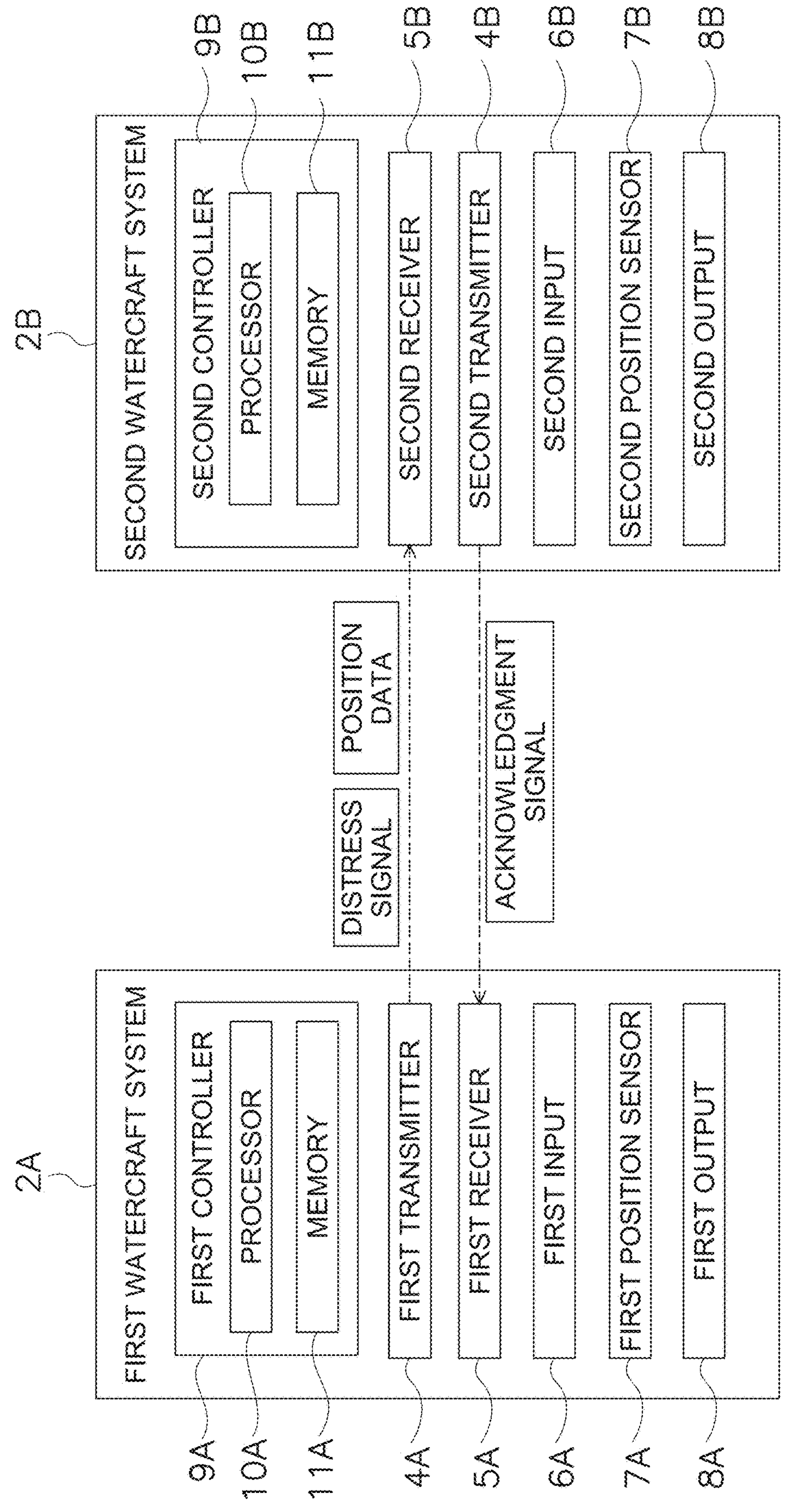
FIG. 2 is a block diagram showing configurations of first and second watercraft systems.

FIG. 2 is a block diagram showing configurations of the first and second watercraft systems 2A and 2B. As shown in FIG. 2, the first watercraft system 2A includes a first transmitter 4A, a first receiver 5A, a first input 6A, a first position sensor 7A, a first output 8A, and a first controller 9A. The first transmitter 4A transmits a distress signal of the first watercraft 3A. The first receiver 5A receives a distress signal from a transmitter of another watercraft. The first transmitter 4A transmits the distress signal by broadcasting. In other words, the first transmitter 4A transmits the distress signal to the receivers of all the other watercraft located within the predetermined communication range 100 about the first watercraft 3A. The first transmitter 4A and the first receiver 5A communicate with the receiver and the transmitter of other watercraft, respectively, through a communication network such as a mobile communication network, a satellite communication network, or a LAN (Local Area Network).

The first input 6A outputs operating signals depending on input operations performed by a user. The first input 6A includes, for instance, a switch. Alternatively, the first input 6A may include a touch screen. The first input 6A outputs the operating signal to bring about transmission of the distress signal of the first watercraft 3A to the first controller 9A when a predetermined input operation is performed by the user.

The first position sensor 7A outputs position data indicating the position of the first watercraft 3A. The position of the first watercraft 3A is expressed based on, for instance, a global coordinate system relative to the earth. The first position sensor 7A detects the position of the first watercraft 3A with, for instance, the GNSS (Global Navigation Satellite System). The first output 8A may be a display including, for instance, an LCD (Liquid Crystal Display), an OLED (Organic Electro-Luminescence Display), or so forth. The first output 8A outputs emergency information indicating the existence of a distress signal from another watercraft.

The first controller 9A includes a processor 10A such as a CPU (Central Processing Unit) and a memory 11A such as a RAM (Random Access Memory) or a ROM (Read Only Memory). The first controller 9A receives the operating signals from the first input 6A. The first controller 9A receives the position data from the first position sensor 7A. The first controller 9A causes the first transmitter 4A to transmit the distress signal upon receiving the operating signal corresponding to the predetermined input operation from the first input 6A.

The second watercraft system 2B includes a second transmitter 4B, a second receiver 5B, a second input 6B, a second position sensor 7B, a second output 8B, and a second controller 9B. The second controller 9B includes a processor 10B and a memory 11B. The second transmitter 4B, the second receiver 5B, the second input 6B, the second position sensor 7B, the second output 8B, and the second controller 9B are similar to the first transmitter 4A, the first receiver 5A, the first input 6A, the first position sensor 7A, the first output 8A, and the first controller 9A, respectively. Therefore, detailed explanation thereof will be hereinafter omitted.

Figure 3:
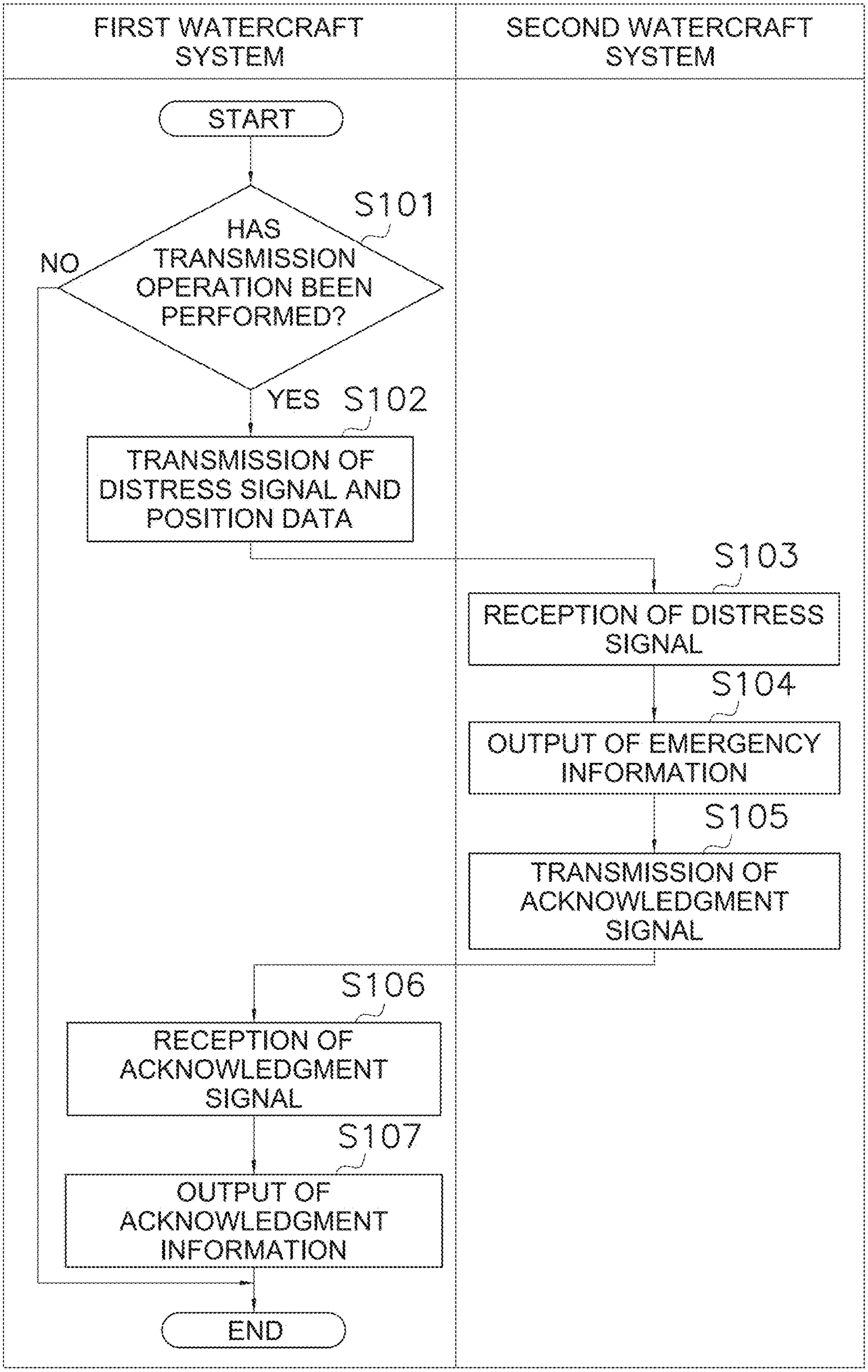
FIG. 3 is a flowchart showing a series of processes executed by first and second controllers.

Now, explanation will be provided for a series of processes to be executed in the following situation: the first watercraft 3A transmits a distress signal, and the second watercraft 3B, located within the predetermined communication range 100 about the first watercraft 3A, receives the distress signal. FIG. 3 is a flowchart showing a series of processes executed by the first and second controllers 9A and 9B.

As shown in FIG. 3, in step S101, the first controller 9A determines whether or not a transmission operation has been performed. When an operator of the first watercraft 3A operates the first input 6A, the first input 6A outputs an operating signal, indicating a command to transmit a distress signal, to the first controller 9A. Upon receiving the operating signal, the first controller 9A determines that the transmission operation has been performed. When the transmission operation has been performed, the process proceeds to step S102. In step S102, the first controller 9A causes the first transmitter 4A to transmit the distress signal of the first watercraft 3A and position data indicating the position of the first watercraft 3A.

Figure 4:
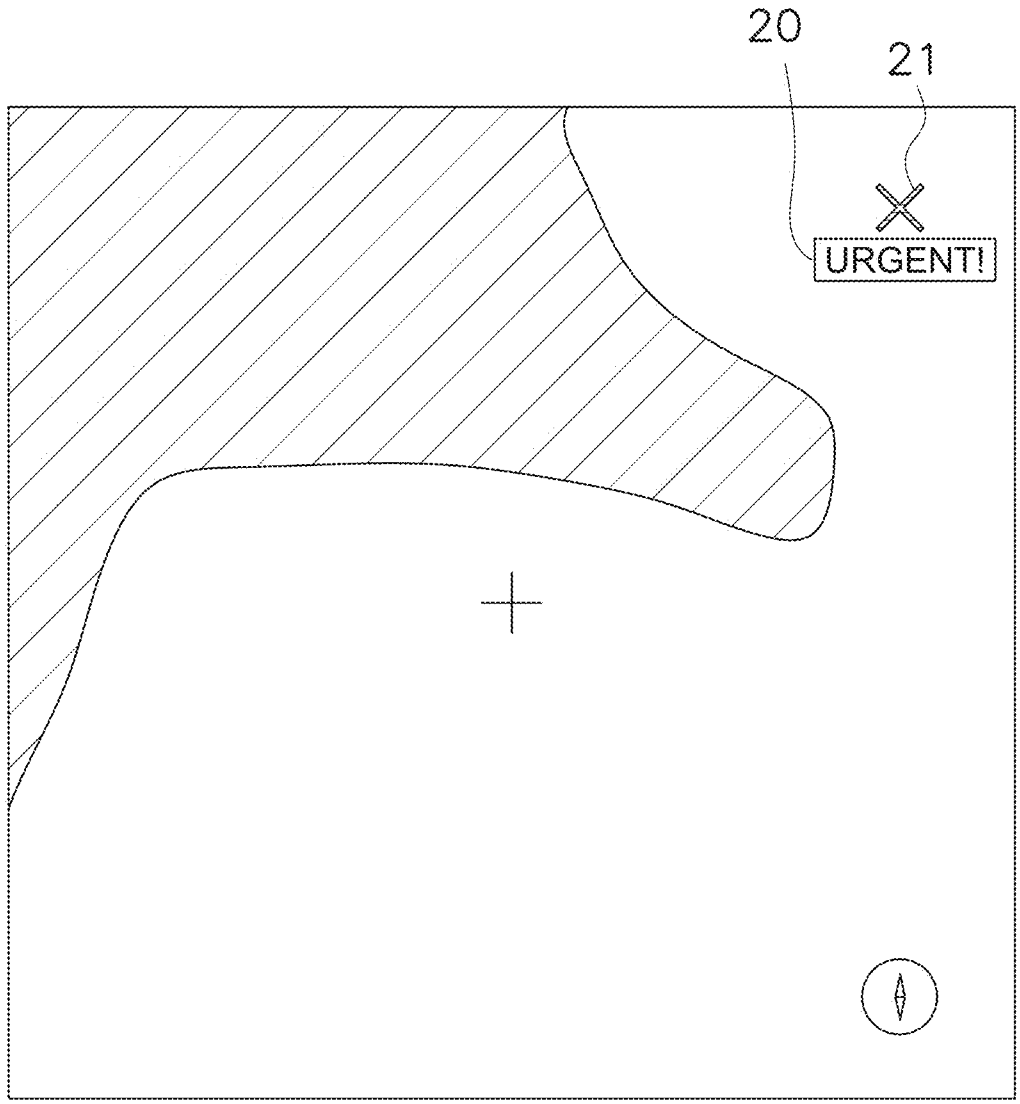
FIG. 4 is a diagram showing an example of emergency information.

In step S103, the second receiver 5B receives the distress signal and the position data from the first watercraft 3A. In step S104, the second controller 9B causes the second output 8B to output emergency information. FIG. 4 is a diagram showing an example of the emergency information. As shown in FIG. 4, the emergency information contains an indicator 20 that indicates existence of a watercraft from which a distress signal has been transmitted. The indicator 20 may be a text or an icon, for example. The emergency information includes information indicating the position of the watercraft from which the distress signal has been transmitted. The emergency information may be an icon 21, for example, displayed on a map to indicate the position of the watercraft from which the distress signal has been transmitted. The emergency information may include a voice or alarm sound without being limited to items displayed on the map.

In step S105, the second controller 9B causes the second transmitter 4B to transmit an acknowledgment signal. The acknowledgment signal is a signal indicating that the second watercraft 3B has received the distress signal from the first watercraft 3A and will go to rescue of the watercraft 3A. When an operator of the second watercraft 3B operates the second input 6B, the second input 6B outputs an operating signal indicating a command to transmit the acknowledgment signal to the second controller 9B. Upon receiving the operating signal, the second controller 9B causes the second transmitter 4B to transmit the acknowledgment signal.

In step S106, the first receiver 5A receives the acknowledgment signal from the second watercraft 3B. In step S107, the first controller 9A causes the first output 8A to output acknowledgment information. The acknowledgment information includes information indicating that the second watercraft 3B will go to rescue of the first watercraft 3A. The acknowledgment information may include position data indicating the position of the second watercraft 3B.

In the rescue network system 1 explained above, a first watercraft causes a transmitter thereon to transmit a distress signal when in an emergency, and a second watercraft located nearby receives the distress signal. Thus, the first watercraft is able to inform the second watercraft of the emergency state thereof. Similarly, the first watercraft receives, through a receiver thereof, a distress signal from another watercraft. Thus, the first watercraft is informed that another watercraft located nearby is in an emergency. Therefore, when the rescue network system 1 is installed in a plurality of watercraft, each watercraft is able to be quickly rescued by cooperation with other watercraft even without other watercraft being located close enough to be in the field of view of each watercraft.

Preferred embodiments of the present invention have been explained above. However, the present invention is not limited to the preferred embodiments described above, and a variety of changes can be made without departing from the gist of the present invention.

Figure 5:
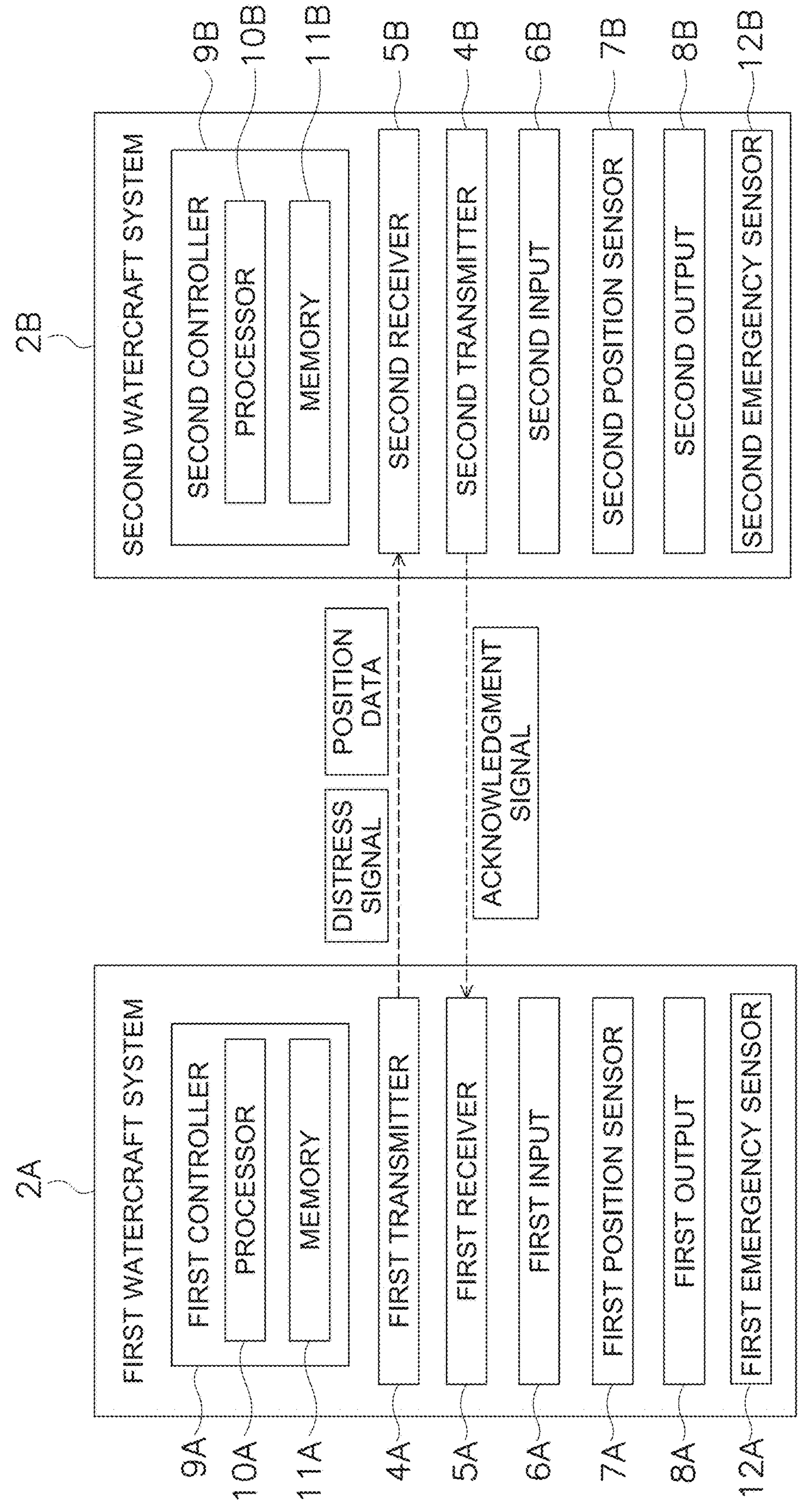
FIG. 5 is a block diagram showing configurations of the first and second watercraft systems according to another preferred embodiment of the present invention.

In a preferred embodiment of the present invention described above, the distress signal is transmitted from the first transmitter 4A through manual operation of the first input 6A by the operator of the first watercraft 3A. However, the first watercraft system 2A may detect the state of the first watercraft 3A and automatically transmit the distress signal depending on the state. FIG. 5 is a block diagram showing configurations of the first and second watercraft systems 2A and 2B according to another preferred embodiment of the present invention.

As shown in FIG. 5, the first watercraft system 2A includes a first emergency sensor 12A. The first emergency sensor 12A detects information indicating the emergency state of the first watercraft 3A to which it belongs. For example, the first emergency sensor 12A detects capsizing of the first watercraft 3A. The first emergency sensor 12A may be a sensor that detects the posture of the watercraft with an IMU (Inertial Measurement Unit) or so forth. Alternatively, the first emergency sensor 12A may be a sensor that detects pitching, rolling, and/or yawing of the watercraft such as an accelerator sensor or an angular rate sensor. The second watercraft system 2B includes a second emergency sensor 12B. The second emergency sensor 12B is configured in a similar manner to the first emergency sensor 12A.

Figure 6:
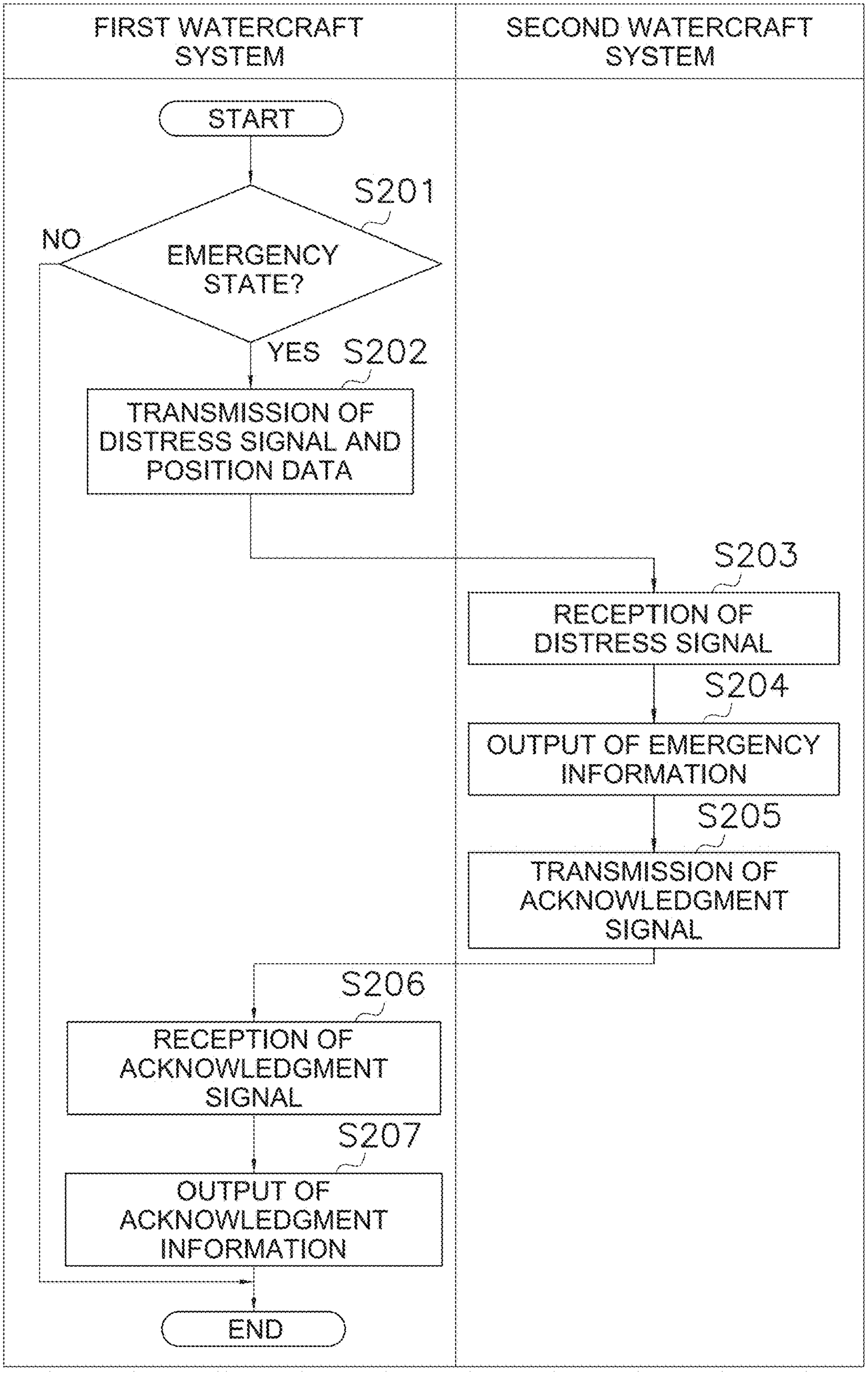
FIG. 6 is a flowchart showing a series of processes executed by the first and second controllers according to another preferred embodiment of the present invention.

FIG. 6 is a flowchart showing a series of processes executed by the first and second controllers 9A and 9B according to the present preferred embodiment. As shown in FIG. 6, in step S201, the first controller 9A determines whether or not the watercraft 3A, to which it belongs, is in an emergency state based on the information detected by the emergency sensor 12A. When the first controller 9A determines that the watercraft 3A is in the emergency state, the process proceeds to step S202.

In step S202, the first controller 9A causes the first transmitter 4A to transmit the distress signal. In other words, when the first controller 9A determines that the watercraft 3A is in the emergency state, the first controller 9A executes automatic signal transmission of the distress signal. It should be noted that the first controller 9A may switch between enabling and disabling the automatic signal transmission depending on the operating signals from the first input 6A. A series of processes in steps S203 to S207 is similar to the series of processes in steps S103 to S107 described above; thus, explanation thereof will be hereinafter omitted.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A system comprising:

a transmitter to transmit a first distress signal of a watercraft in which the system is installed;

a receiver to receive a second distress signal from another watercraft;

an output to output emergency information indicating existence of the second distress signal; and a controller configured or programmed to control the output to output the emergency information when the receiver has received the second distress signal.

2. The system according to claim 1, further comprising:

an emergency sensor to detect information indicating an emergency state of the watercraft; wherein the controller is configured or programmed to:

determine whether or not the watercraft is in the emergency state based on the information detected by the emergency sensor; and execute automatic signal transmission by causing the transmitter to transmit the first distress signal when it is determined that the watercraft is in the emergency state.

3. The system according to claim 2, further comprising:

an input to output operating signals to the controller depending on input operations performed on the input; wherein the controller is configured or programmed to switch between enabling and disabling the automatic signal transmission depending on the operating signals outputted from the input.

4. The system according to claim 1, further comprising:

an input to output operating signals to the controller depending on input operations performed on the input; wherein the controller is configured or programmed to execute manual signal transmission by causing the transmitter to transmit the first distress signal when at least a predetermined one of the operating signals is outputted from the input.

5. The system according to claim 1, further comprising:

a position sensor to output position data indicating a position of the watercraft; wherein the controller is configured or programmed to cause the transmitter to transmit the position data together with the first distress signal of the watercraft.

6. The system according to claim 5, wherein the emergency information includes information indicating a position of the another watercraft that transmits the second distress signal.

7. A rescue network system for watercraft installed in a plurality of watercraft including a first watercraft and a second watercraft, the rescue network system comprising:

a first watercraft system installed in the first watercraft, the first watercraft system including:

a first transmitter to transmit a first distress signal of the first watercraft;

a first receiver to receive a second distress signal from the second watercraft;

a first output to output emergency information indicating an existence of the second distress signal; and a first controller configured or programmed to control the first output to output the emergency information indicating the existence of the second distress signal when the first receiver has received the second distress signal; and a second watercraft system installed in the second watercraft, the second watercraft system including:

a second transmitter to transmit the second distress signal;

a second receiver to receive the first distress signal from the first watercraft;

a second output to output emergency information indicating the existence of the first distress signal; and a second controller configured or programmed to control the second output to output the emergency information indicating the existence of the first distress signal when the second receiver has received the first distress signal.

* * * * *